United States Patent [19]

Burgess et al.

[11] Patent Number: 4,862,789
[45] Date of Patent: Sep. 5, 1989

[54] POSITIVE DISPLACEMENT PUMP OR MOTOR UTILIZING A SELF-LUBRICATED BEARING

[75] Inventors: Roy T. Burgess, Troy; Gregory P. Campau, Livonia; Leslie M. Claar, Farmington Hills; Robert C. Hodges, Troy; Douglas G. Snow, Walled Lake; Roy Taylor, Grosse Ile, all of Mich.

[73] Assignee: Vickers, Incorporated, Troy, Mich.

[21] Appl. No.: 150,933

[22] Filed: Feb. 1, 1988

[51] Int. Cl.⁴ .......................... F01B 3/00; F01B 13/04
[52] U.S. Cl. .................................. 92/12.2; 417/222;
384/625; 384/103; 384/276; 384/42
[58] Field of Search .......................... 417/222; 91/505;
92/12.1, 12.2.153; 384/42, 276, 297, 298, 299, 300, 908, 911

[56] References Cited

U.S. PATENT DOCUMENTS

| | | |
|---|---|---|
| 3,124,008 | 3/1964 | Firth et al. .............................. 74/60 |
| 3,991,658 | 11/1976 | Bobier ..................................... 91/505 |
| 4,459,047 | 7/1984 | Silver ..................................... 384/103 |
| 4,654,939 | 4/1987 | Silver ..................................... 384/625 |

FOREIGN PATENT DOCUMENTS

| | | |
|---|---|---|
| 1049165 | 1/1959 | Fed. Rep. of Germany ...... 384/276 |
| 1286827 | 1/1969 | Fed. Rep. of Germany ...... 384/276 |
| 2401804 | 7/1974 | Fed. Rep. of Germany ........ 384/24 |
| 0615566 | 1/1961 | Italy ....................................... 384/276 |
| 0057921 | 4/1982 | Japan ....................................... 384/42 |
| 0191962 | 1/1967 | U.S.S.R. ............................... 384/276 |

Primary Examiner—Robert E. Garrett
Assistant Examiner—Thomas Denion
Attorney, Agent, or Firm—Barnes, Kisselle, Raisch, Choate, Whittemore & Hulbert

[57] ABSTRACT

A variable speed pressure energy translating device including a plurality of axially extending pistons and associated cylinders and a yoke engaged by the pistons and pivoted on a transverse axis for varying the displacement thereof, and a housing having spaced saddle bearing seats. The yoke has spaced complementary saddle bearing engaging portions and an arcuate bearing is seated in each of said seats. Each bearing comprises an arcuate body of polymeric material and an arcuate reinforcing member embedded in the body and having a plurality of perforations throughout which are fixed in the reinforcing member with the polymeric material extending through said perforations.

20 Claims, 4 Drawing Sheets

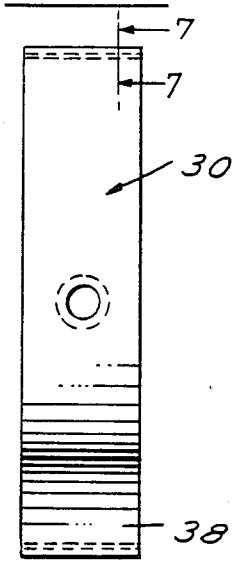
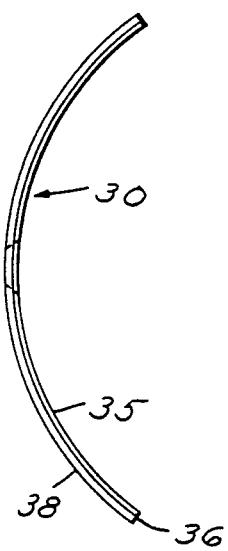
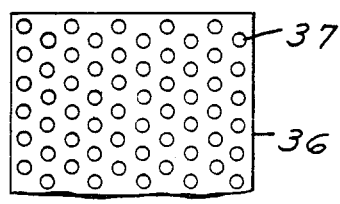
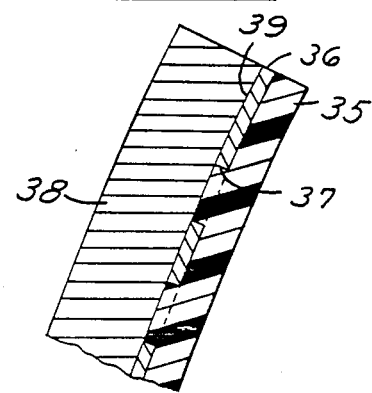
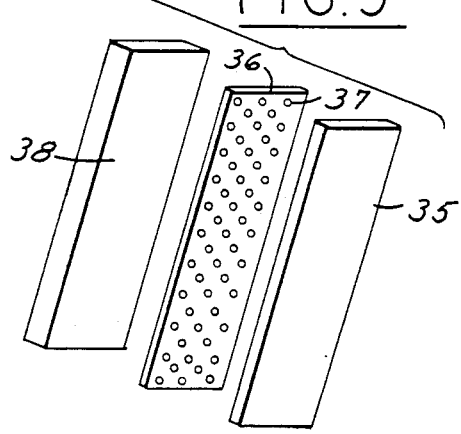

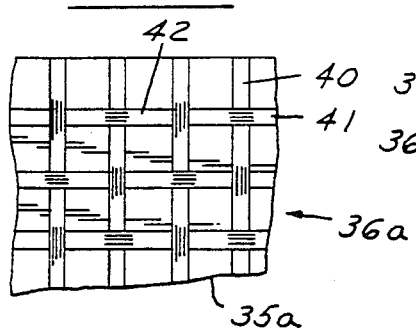
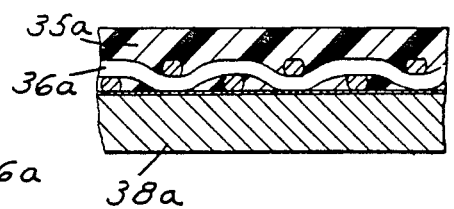
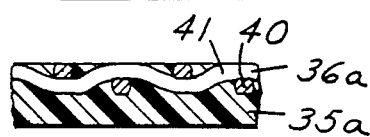
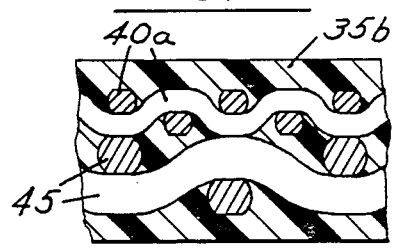
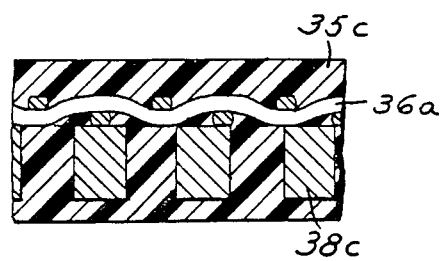
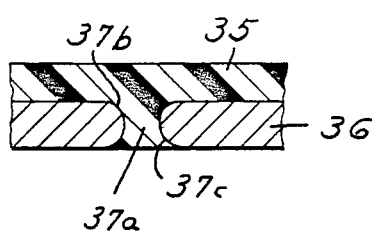
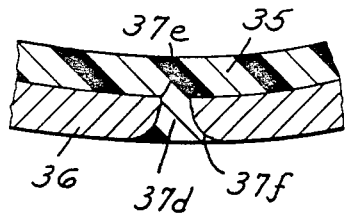

POSITIVE DISPLACEMENT PUMP OR MOTOR UTILIZING A SELF-LUBRICATED BEARING

This invention relates to hydraulic pumps and motors, and particularly to such motors including bearings.

BACKGROUND AND SUMMARY OF THE INVENTION

Hydraulic pumps and motors of the piston type utilize a plurality of axially extending pistons and associated cylinders and a yoke engaged by the pistons and pivoted by annular bearings in a housing.

In another type of hydraulic pump or motor, the bearing form is that of a partial journal bearing often termed a "saddle bearing". The use of this bearing form gives the advantage of a reduction in overall size and in utilizing fewer parts in the bearing area thereby making it more reliable, easier to maintain, involving less deflection on the yoke. The saddle bearing can be either a rolling element or a non-rolling element bearing format. This invention deals with a non-rolling element form of saddle bearing.

In hydraulic pumps and motors journal bearings generally function through hydrodynamic, hydrostatic or hybrid oil film generation processes. There are, however, circumstances when normal lubrication mechanics are insufficient to correctly form a fluid film for the journal bearing to function, typical cases are extreme load, quasi-steady state operation or poor lubrication. Such is the case with a non hydrostatic form of a saddle bearing. Under these circumstances surface to surface contact can and does occur with resulting high coefficients of friction and wear rates. In an attempt to overcome this problem a self lubricated material is used for one of the surfaces in contact. Self lubricated bearings, thus formed however, do have limitations; temperature, load, speed of operation, etc. Many of the self lubricated bearing forms utilize a polymer as the self lubricated material. While these polymers impart a low coefficient of friction for the bearing pair they have a relatively low load capacity due to the yield strength of the polymer. Other materials possessing a higher yield strength cannot achieve a suitably low coefficient of friction. Attempts have been made to increase the yield strength of the polymer by the use of a filler material intimately mixed with the polymer to form a composite material. These composites have, however, failed due to an increase in the coefficients of friction. These higher coefficients of friction are due to the wear process exposing the filler material so that the mating surface no longer rides on a true polymer interface. Another technique, which has been used to attempt to increase the yield strength of the polymer is the incorporation of a woven metal screen to form a composite. This also fails as the friction between the metal threads is insufficient to prevent yielding of both the polymer and the lateral movement of the screen wires across each other. Further, the yielding of the screen wire can be preferential depending on the direction of the shear force and the "lay" or "bias" of the woven screen. Attempts to further increase the strength of the composite by adhesively bonding the screen to a metal backing has failed as the area open to bonding is small due to the roundness of the screen wires and the fill of the polymer in the mesh.

Accordingly, among the objectives of the present invention are to provide a positive displacement pump or motor which has a non-rolling element saddle type bearing of increased load capacity; which would withstand the normal forces on the bearing on the pump or motor; and which can be relatively easily manufactured.

In accordance with the invention, the variable speed pressure energy translating device includes a plurality of axially extending pistons and associated cylinders and a yoke engaged by the pistons and pivoted on a transverse axis for varying the displacement thereof, and a housing having spaced saddle bearing seats. The yoke has spaced complementary saddle bearing engaging portions and an arcuate bearing is seated in each of said seats. Each bearing comprises an arcuate body of polymeric material and an arcuate reinforcing member embedded in the body and having a plurality of perforations throughout which are fixed in the reinforcing member with the polymeric material extending through said perforations.

DESCRIPTION OF THE DRAWINGS

FIG. 5 is a plan view of the bearing.

FIG. 6 is a side view of the bearing.

FIG. 7 is a fragmentary sectional view on a greatly enlarged scale taken along the line 7—7 in FIG. 6.

FIG. 8 is a plan view of a portion of the bearing.

FIG. 9 is an exploded view of the parts of the bearing prior to their being assembled.

FIG. 10 is a fragmentary sectional view of a modified form of bearing.

FIG. 11 is a fragmentary plan view on an enlarged scale of a portion of the bearing shown in FIG. 12.

FIG. 12 is a fragmentary sectional view on enlarged scale of another portion of the bearing shown in FIG. 10.

FIG. 13 is a fragmentary sectional view showing the bearing portion of FIG. 12 after it is formed to arcuate form.

FIG. 14 is a further modified form of bearing.

FIG. 15 is another form of the bearing.

FIG. 16 is a fragmentary sectional view on an enlarged scale of a portion of the bearing shown in FIG. 7.

FIG. 17 is a fragmentary sectional view on an enlarged scale of a modified form of bearing.

DESCRIPTION

Figure 1:
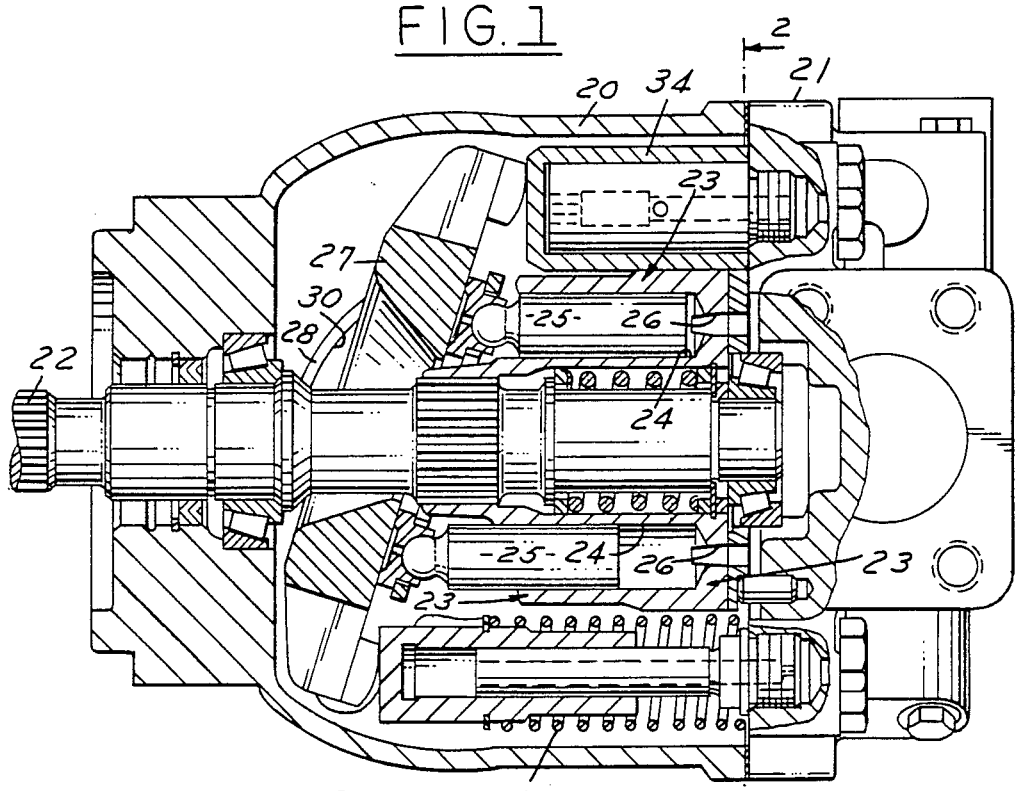
FIG. 1 is a longitudinal part sectional view of a positive displacement pump or motor embodying the invention.
Figure 2:
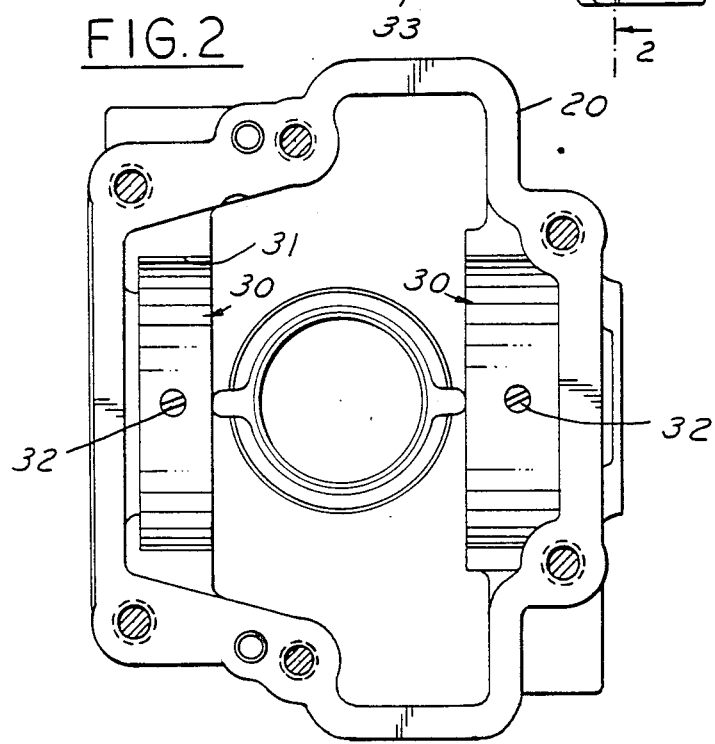
FIG. 2 is a sectional view taken along the line 2—2 in FIG. 1, parts being taken away.
Figure 3:
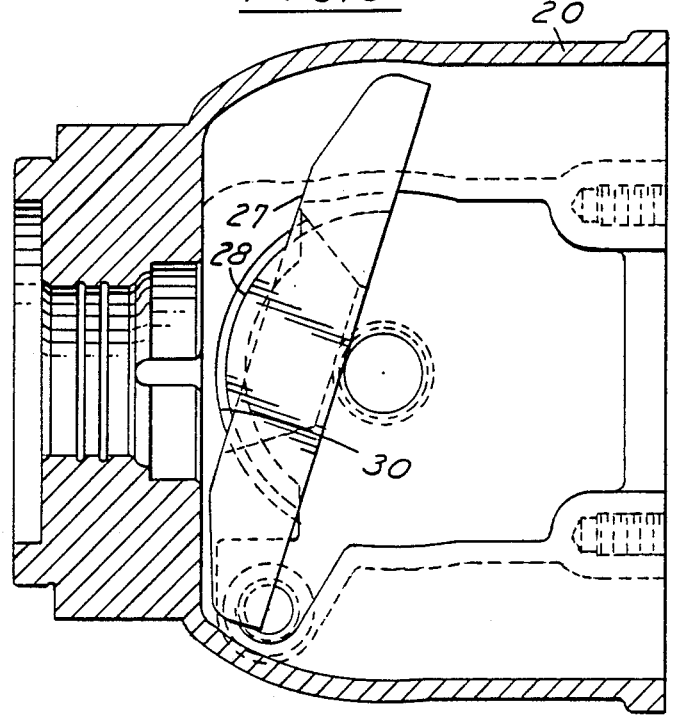
FIG. 3 is a sectional view similar to FIG. 1, parts being taken away.
Figure 4:
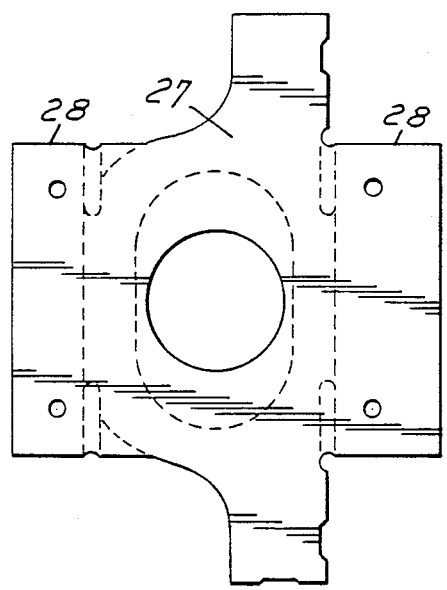
FIG. 4 is a plan view of the yoke of the pump or motor.

Referring to FIGS. 1-4, the invention relates particularly to a pressure energy translating device in the form of a pump or motor that is of generally well known construction and comprises a housing 20 with a housing cover 21. A drive shaft 22 is mounted in the pump housing and cover and supports a rotor 23 which houses an annular series of pump cylinders 24, each of which incorporates an axially movable pump piston 25. Each pump cylinder 24 has an opening 26 and these openings function, as the rotor turns, in a manner like that of a slide valve with the pump housing cover 21. The pistons 25 in the cylinders 24 work in unison with an obliquely set yoke 27 in such a manner that as the rotor revolves, the pistons produce an axial back-and-forth motion. The yoke 27 has arcuate bearing surfaces of seats 28 that are engaged by arcuate saddle bearings 30 mounted in recesses 31 in the housing 20. A spring 33 yieldingly urges the yoke 27 to an oblique position, as shown, when under no pressure. The yoke 27 can be moved under pressure from a piston 34 to vary the pump displacement. Pressure regulators and other controls are provided in the head 21 as is well known in the art.

In accordance with the invention, the bearing 30 comprises an arcuate body of thermoplastic material, preferably polytetrafluoroethylene, and an arcuate reinforcing member at least partially embedded in the plastic body.

Referring to FIGS. 5-9, a preferred form of bearing comprises the plastic body 35, an arcuate metal shim 36 having openings 37 through which a portion of the plastic extends, and an arcuate metal backing member 38 adhered to the shim and plastic by adhesive 39.

The bearing is made initially in flat form. By using a film form of adhesive that is cured by heat and pressure, the three piece bearing can be formed into one unit by the application of pressure in a heat box. In this process, the plastic 35 is formed through the openings 37 and the metal member 36 is adhered to the backing member 38. After curing, the bearing is formed to the required shape. Alternatively, the body 35 and metal member 36 may be formed and shaped prior to applying to the previously curved backing member 38. In a typical example, the thickness of the thin member 36 is 0.381 mm, the assembled thickness of the bearing is 3.00 mm and the thickness of the backing member 38 is 1.9 mm. The openings in the thin member 36 have a diameter of 1.00 mm and are provided in rows spaced apart 2.00 mm.

The openings 37 in metal member 38 are preferably formed such that they are not of the same cross section in order to increase the shear strength. More specifically, if the openings 37 are photochemically etched, they have an hourglass shape, as shown in FIG. 16, including a narrow intermediate portion 37a, and flared end portions 37b, 37c which serve to more effectively lock the plastic body 35 and metal member 36. This increases the shear strength. If the openings 37 are formed by punching, the punching operation results in a narrow portion 37d, a sharp edge 37e at one end and a flared portion 37f at the other end. This also serves to increase the shear strength.

In the form shown in FIGS. 10-13, the bearing comprises an embedded member in the form of a specially fabricated metal wire mesh provided adjacent one surface of the body 35a. As shown in FIG. 11 on a greatly enlarged scale, the interwoven wires 40, 41 of the reinforcing member 36a are flattened as at 42 by passing through rollers and are sintered to one another so that the wires 40, 41 are bonded and fixed relative to one another prior to embedding in the body 35a. The bearing can be utilized with or without a backing member 38a adhered to the bearing. As shown in FIG. 12, the body is first fabricated in flat form and then rolled and curved to the desired arcuate configuration as shown in FIG. 13.

In the form shown in FIG. 14, the backing member 38 has been replaced with a second coarser form of screen 45. In this form, it is possible to fill the rear of the bearing with a polymer material 35b to form a compliant bearing. The wires 40a, 41a are flattened and sintered to one another and to the first screen as by sintering.

In the form shown in FIG. 15, a backing plate 38c also has openings 46 through which the plastic of the body extends to form a compliant bearing which will accommodate tolerances in the surfaces 38c.

It can thus be seen that in each of the forms of the invention, the effective yield strength of the plastic polymer is increased by utilization of an embedded thin member which has the effect of minimizing the yielding under load by mechanically locking the polymer in place.

In the form where the embedded member comprises woven metal screening, the welding or bonding of the strands together with the flattening of the strands increases the mechanical bonding and prevents the strands from sliding relative to one another.

We claim:

1. In a variable speed pressure energy translating device which includes a plurality of axially extending pistons and associated cylinders and a yoke engaged by the pistons and pivoted on a transverse axis for varying the displacement thereof, the improvement comprising a housing having spaced saddle bearing seats, said yoke having spaced complementary saddle bearing engaging portions, and an arcuate bearing seated in each of said seats, each said bearing comprising an arcuate body of polymeric material and an arcuate reinforcing member embedded in said body and having a plurality of perforations extending therethrough, said perforations having a cross section which varies longitudinally thereof, and said polymeric material filling and extending throughout said perforations.

2. The combination set forth in claim 1 wherein said polymeric material extends entirely through said perforations and forms a layer of polymeric material adjacent said seat.

3. The combination set forth in claim 1 wherein said reinforcing member comprises a thin metal sheet having said perforations therein, said perforations comprising staggered openings through said thin metal sheet.

4. The combination set forth in claim 3 wherein said polymeric material extends entirely through said perforations and forms a layer of polymeric material adjacent said seat.

5. The combination set forth in claim 3 wherein said openings are photochemically etched.

6. The combination set forth in claim 3 wherein said openings are made by punching.

7. The combination set forth in claim 3 wherein said openings include an outwardly flared end.

8. The combination set forth in claim 3 wherein said openings have outwardly flared ends.

9. The combination set forth in claim 3 wherein said sheet is provided adjacent the seat.

10. The combination set forth in claim 9 including a metal backing member interposed and adhered to said metal reinforcing member.

11. The combination set forth in claim 3 wherein said metal reinforcing member is entirely embedded in said polymeric body.

12. The combination set forth in claim 1 wherein said reinforcing member comprises a woven metal body defining said perforations, said body comprising strands which are interlineated, said strands being flattened at the overlapping portions and directly bonded to one another at said overlapping portions.

13. The combination set forth in claim 12 wherein said polymeric material extends entirely through said perforations and forms a layer of polymeric material adjacent said seat.

14. The combination set forth in claim 12 wherein said reinforcing member is provided adjacent one surface of said polymeric body.

15. The combination set forth in claim 14 wherein said bearing comprises a metal body interposed between the seat and adhered to the body.

16. The combination set forth in claim 12 including a second reinforcing member comprising a woven metal body defining perforations, said second woven body comprising strands which are interlineated, said strands of said second woven body being flattened at the overlapping portions and directly bonded to one another at said overlapping portions.

17. The combination set forth in claim 16 wherein said polymeric material extends entirely through said perforations and forms a layer of polymeric material adjacent said seat.

18. The combination set forth in claim 16 wherein said second woven body is directly bonded to said first woven body.

19. The combination set forth in claim 18 including a reinforcing member comprising a thin metal sheet having openings therein embedded in said body.

20. The combination set forth in claim 19 wherein said polymeric material extends entirely through said perforations and forms a layer of polymeric material adjacent said seat.

* * * * *